(12) United States Patent  
Barber et al.

(10) Patent No.: US 7,054,137 B1  
(45) Date of Patent: May 30, 2006

(54) REFRACTORY METAL NICKEL ELECTRODES FOR CAPACITORS

(75) Inventors: Daniel E. Barber, Greenville, SC (US); Aiying Wang, Simpsonville, SC (US); Michael S. Randall, Simpsonville, SC (US); Azizuddin Tajuddin, Laurens, SC (US)

(73) Assignee: Kemet Electronic Corporation, Greenville, SC (US)

( * ) Notice: Subject to any disclaimer, the term of this patent is extended or adjusted under 35 U.S.C. 154(b) by 0 days.

(21) Appl. No.: 10/998,368

(22) Filed: Nov. 29, 2004

(51) Int. Cl.  
*H01G 4/005* (2006.01)

(52) U.S. Cl. ............... 361/321.1; 361/303; 361/321.2; 361/311; 361/313; 361/306.3

(58) Field of Classification Search .. 361/321.1–321.5, 361/311–313; 501/136, 137  
See application file for complete search history.

(56) References Cited

U.S. PATENT DOCUMENTS

| | | | |
|---|---|---|---|
| 4,055,850 A | 10/1977 | Prakash | 361/305 |
| 4,241,378 A | 12/1980 | Dorrian | 361/305 |
| 4,458,294 A * | 7/1984 | Womack | 361/321.3 |
| 4,613,560 A | 9/1986 | Dueber et al. | 430/286 |
| 4,636,332 A | 1/1987 | Craig et al. | 252/514 |
| 4,864,465 A | 9/1989 | Robbins | 361/321 |
| 4,925,771 A | 5/1990 | Nebe et al. | 430/281 |
| 4,959,295 A | 9/1990 | Nebe et al. | 430/281 |
| 5,011,803 A | 4/1991 | Park et al. | 501/136 |
| 5,371,050 A * | 12/1994 | Belitskus et al. | 501/95.2 |
| 5,599,757 A | 2/1997 | Wilson et al. | 501/137 |
| 5,600,533 A | 2/1997 | Sano et al. | 361/321.4 |
| 5,835,645 A * | 11/1998 | Jorgenson et al. | 385/12 |
| 5,948,320 A | 9/1999 | Nikaidoh et al. | 252/512 |
| 5,973,246 A | 10/1999 | Nikaidoh et al. | 252/512 |
| 5,973,907 A | 10/1999 | Reed | 361/306.1 |
| 6,078,494 A * | 6/2000 | Hansen | 361/321.5 |
| 6,156,237 A | 12/2000 | Kubota et al. | 252/512 |
| 6,159,267 A | 12/2000 | Hampden-Smith et al. | 75/252 |
| 6,197,222 B1 | 3/2001 | Saraf et al. | 252/519.31 |
| 6,226,169 B1 | 5/2001 | Naito et al. | 361/303 |
| 6,304,427 B1 | 10/2001 | Reed et al. | 361/523 |
| 6,315,927 B1 | 11/2001 | Kubota et al. | 252/512 |
| 6,399,282 B1 | 6/2002 | Kubota et al. | 430/311 |
| 6,550,117 B1 | 4/2003 | Tokuoka et al. | 29/25.42 |
| 6,577,494 B1 | 6/2003 | Watanabe et al. | 361/321.2 |
| 6,630,387 B1 | 10/2003 | Horii | 438/396 |
| 6,661,645 B1 * | 12/2003 | Sakai et al. | 361/523 |
| 6,753,218 B1 | 6/2004 | Devoe et al. | 438/240 |
| 6,769,159 B1 | 8/2004 | Haratani et al. | 29/25.42 |
| 6,780,456 B1 | 8/2004 | Kunishi et al. | 427/58 |

OTHER PUBLICATIONS

Modelling surface phenomena in Pd-Ni alloys, Helfensteyn et al., Applied Surface Science 212-213 (2003) 844-849.

* cited by examiner

*Primary Examiner*—Nguyen T. Ha  
(74) *Attorney, Agent, or Firm*—Joseph T. Guy; Nexsen Pruet, LLC

(57) ABSTRACT

A capacitor with conductive layers arranged in parallel relationship. The conductive layers have nickel alloyed with a refractory metal in an amount sufficient to raise the melting temperature of said conductive layer at least 1° C. above the melting temperature of nickel. A dielectric layers is between the conductive layers. Alternating layers of said conductive layers are in electrical contact with external terminations of opposing polarity.

81 Claims, 1 Drawing Sheet

REFRACTORY METAL NICKEL ELECTRODES FOR CAPACITORS

BACKGROUND OF THE INVENTION

The present invention is related to improved capacitors comprising thin electrodes with improved physical properties. More specifically, the present invention is related to ceramic capacitors comprising thin nickel based electrodes with refractory metals incorporated therein.

Ceramic capacitors, and their manufacture, are well known in the art. In general, ceramic capacitors comprise alternating layers of conductive metal and ceramic. The manner in which such capacitors are formed typically involves formation of a green, unfired, ceramic layer with metal layers on either side thereof. The green ceramic is then fired at high temperature to form sintered ceramic layers between conductive layers of metal.

A problem well known to the artisan is the difficulty associated with firing a ceramic to a temperature sufficient to achieve optimal properties while, at the same time, avoiding degradation of the metallic conductive layer. Attempts to solve this problem are legion yet none are totally adequate.

Many artisans have attempted to lower the sintering temperature of the ceramic layer as set forth in U.S. Pat. No. 5,011,803 or to minimize oxidation of the conductor as set forth in U.S. Pat. No. 5,600,533. Still others have attempted to develop ceramic coating solutions that readily calcine in substantially nonoxidizing atmosphere as set forth in U.S. Pat. Nos. 4,959,295 and 4,925,771; 4,912,019; 4,908,296 and 4,613,560.

Other artisans have utilized high melting point conductors such as those containing platinum and palladium in alloy with silver, for example. The high cost of platinum and palladium is contrary to the continual demand to lower the cost of capacitors.

Nickel is the preferred conductor in ceramic capacitors due to the low cost and adequate conductive properties. Unfortunately, nickel has a melting point of about 1,455° C. and is highly susceptible to oxidizing at firing temperatures. Nickel oxide is highly undesirable due to unacceptably low conductivity. If nickel oxide is used the nickel must be reduced after firing of the ceramic to achieve adequate results. This requires an additional processing step which is undesirable. Typically, the ceramic is fired in neutral or reducing atmosphere to maintain the nickel in metallic, or unoxidized, form. Unfortunately, the surface energy of nickel is high at elevated temperature in a reducing, or neutral, atmosphere. Due to the high surface energy nickel desires to pull away from the ceramic during firing. The result is inconsistent layer thickness, as can be visualized under magnification, and poor electrical properties, as can be realized in routine testing. To avoid these losses thick layers of nickel such as larger than 1.5 μm are typically employed which is contrary to the desire to lower cost.

It has been a long felt desire to be able to utilize nickel electrodes without the problems associated with poor surface energy at firing temperature or the requirement that thick layers be used. Prior to the present invention this problem has been considered insurmountable.

SUMMARY OF THE INVENTION

It is an object of the present invention to provide a ceramic capacitor which can be manufactured at lower cost.

It is another object of the present invention to provide a capacitor with nickel metal electrode layers which are thinner than previously thought possible thereby improving both the manufacturing cost and overall dimension of the capacitor. The thinner layers can be achieved without loss of conduction or reduction in quality.

In particularly preferred embodiments the improved capacitor has conductive layers with resistivity close to, or lower than layers using unalloyed nickel.

These and other advantages, as will be realized, are provided in a capacitor with conductive layers arranged in parallel relationship. The conductive layers have nickel alloyed with a refractory metal in an amount sufficient to raise the melting temperature of said conductive layer at least 1° C. above the melting temperature of nickel. A dielectric layers is between the conductive layers. Alternating layers of said conductive layers are in electrical contact with external terminations of opposing polarity.

Yet another advantage is provided in a capacitor with conductive layers arranged in parallel relationship. The conductive layers comprise a nickel alloy selected from the group consisting of: nickel alloyed with from 3–95 wt % cobalt; nickel alloyed with from 5–70 wt % chromium; nickel alloyed with from 42–99 wt % molybdenum; nickel alloyed with from 60–95 wt % niobium; nickel alloyed with from 5–95 wt % osmium; nickel alloyed with from 80–99 wt % palladium; nickel alloyed with from 60–99 wt % platinum; nickel alloyed with from 1–99 wt % ruthenium; nickel alloyed with from 1–99 wt % rhodium; nickel alloyed with from 5–99 wt % rhenium; nickel alloyed with from 42–90 wt % tantalum; and nickel alloyed with from 1–99 wt % tungsten. Dielectric layers are between the conductive layers. Alternating conductive layers are in electrical contact with external terminations of opposing polarity.

Yet another embodiment is provided in a capacitor with conductive layers arranged in parallel relationship wherein the conductive layers comprise nickel alloyed with at least one element selected from cobalt, molybdenum, niobium, osmium, palladium, platinum, ruthenium, rhodium, rhenium, tantalum and tungsten in an amount sufficient to raise the melting temperature of said conductive layer at least 1° C. above the melting temperature of elemental nickel. Dielectric layers are between the conductive layers. The alternating layers of conductive layers are in electrical contact with external terminations of opposing polarity.

Yet another embodiment is provided in a capacitor with conductive layers arranged in parallel relationship. The conductive layers comprise nickel alloyed with at least one element selected from platinum, rhodium and tungsten. Dielectric layers are between the conductive layers and alternating layers of the conductive layers are in electrical contact with external terminations of opposing polarity.

Yet another embodiment is provided in a capacitor with conductive layers having a thickness of no more than 1.5 μm arranged in parallel relationship. The conductive layers comprise nickel alloyed with at least one element selected from cobalt, chromium, molybdenum, niobium, osmium, palladium, platinum, ruthenium, rhodium, rhenium, tantalum and tungsten. Dielectric layers are between the conductive layers and alternating layers of the conductive layers are in electrical contact with external terminations of opposing polarity.

DETAILED DESCRIPTION OF THE INVENTION

Figure 1:
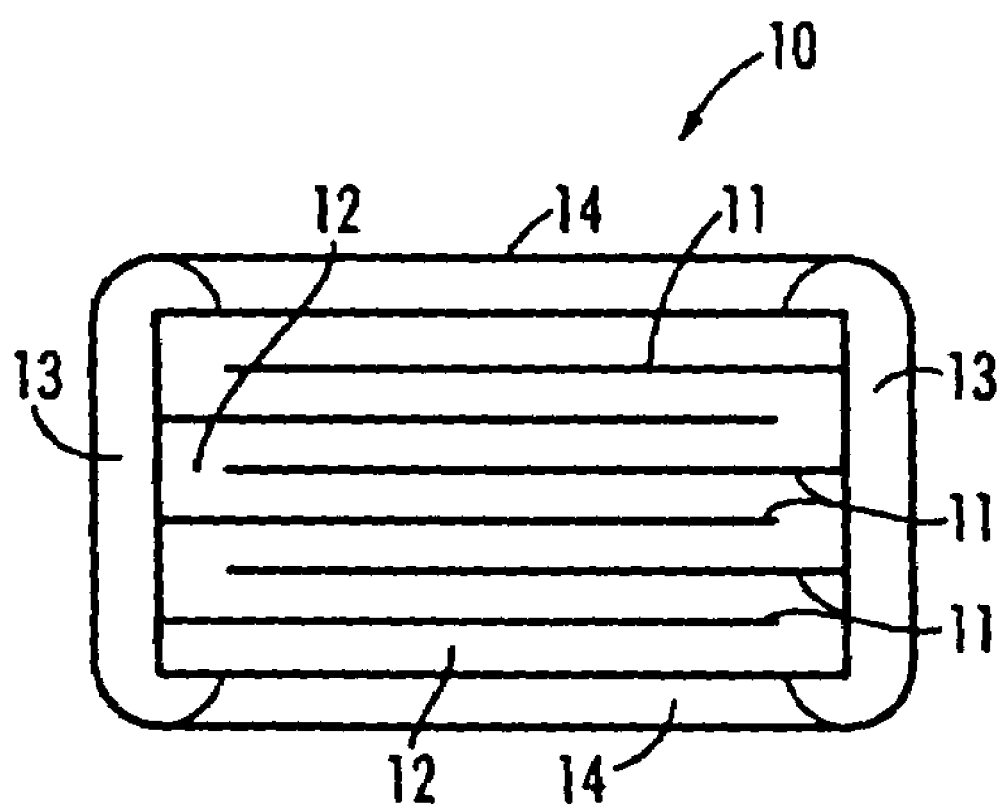
FIG. 1 illustrates a cross-sectional view of a capacitor of the present invention.

The present invention is specific to a ceramic capacitor with electrodes comprising nickel and a refractory metal and referred to herein as an alloy. The terms alloy, alloyed, or an equivalent is used herein even though certain concentrations at certain temperatures may represent phases that are more properly termed admixtures. Due to the inability of the applicant to determine the exact nature of every concentration at every temperature the term alloy, alloyed, or an equivalent is used herein to mean that the nickel and refractory metal are thoroughly mixed as would be done to form an alloy. In particularly preferred embodiments the melting point of the nickel alloy is higher than elemental nickel or the surface energy is lower at ceramic firing temperature in a reducing or neutral atmosphere. The nickel is alloyed with at least one element selected from cobalt, chromium, molybdenum, niobium, osmium, palladium, platinum, ruthenium, rhodium, rhenium, tantalum and tungsten.

The present invention will be described with reference to the various figures forming an integral part of the instant disclosure.

A cross-sectional view of a capacitor of the present invention is illustrated schematically in FIG. 1. In FIG. 1, the capacitor, generally represented at 10, comprises a multiplicity of conductive layers, 11, of nickel alloy with ceramic, 12, dispersed there between. Alternating layers of the conductive layer terminate at opposing external terminals, 13, of opposite polarity. The entire capacitor, except for the lead terminations, 13, is encased in resin, 14.

The conductive layer comprises nickel alloyed with an effective amount of at least one refractory metal selected from cobalt, chromium, molybdenum, niobium, osmium, palladium, platinum, ruthenium, rhodium, rhenium, tantalum and tungsten. More preferably the conductive layer has a sufficient amount of refractory metal to raise the melting point at least 1° C. above the melting point of nickel. More preferably, the conductive layer has a sufficient amount of refractory metal to raise the melting point at least 5° C. above the melting point of nickel. Even more preferably, the conductive layer has a sufficient amount of refractory metal to raise the melting point at least 10° C. above the melting point of nickel. More preferably the conductive layer comprises nickel and an effective amount of at least one refractory metal selected from osmium, rhenium, ruthenium, platinum, rhodium and tungsten. Even more preferably the conductive layer comprises nickel and an effective amount of at least one refractory metal selected from platinum, rhodium and tungsten. Most preferably, the conductive layer comprises nickel and an effective amount of tungsten. An effective amount is defined herein as an amount sufficient to increase the melting temperature by at least 1° C. relative to nickel, or about 1° C. above 1,455° C. Alternatively, an effective amount is sufficient to lower the surface energy relative to nickel at ceramic firing temperature in a reducing or neutral environment.

Nickel has a resistivity of 6.8 μ-ohm cm in bulk. It is preferably to alloy with a metal which has a similar, or lower, resistivity than nickel.

Certain materials, such as boron, carbon, oxygen, phosphorous, calcium, magnesium, manganese and niobium, when alloyed or compounded with nickel have a substantially lower melt and do not have a lower surface energy. These materials are to be avoided.

A nickel cobalt alloy has a melting point which is higher than nickel. Cobalt has a resistivity of 16.0 μ-ohm cm in bulk and therefore higher amounts are not desirable. It is preferred that a nickel cobalt alloy comprise about 3–95 wt % cobalt. Below about 3 wt % cobalt the melt temperature increase is insufficient and above about 95 wt % cobalt the resistivity is detrimental. More preferably the nickel cobalt alloy comprises 10–50 wt % cobalt.

A nickel chromium alloy has a eutectic point at about 47% chromium after which the melting point rises above that of nickel. Chromium has a resistivity of 19.6 μ-ohm cm in bulk and therefore higher amounts are not desirable. Below the eutectic point chromium indicates a lower melt point yet chromium is known to scavenge carbon and may favorably alter the melt point of the alloy, relative to nickel. It is preferred that a nickel chromium alloy comprise about 5–70 wt % chromium.

A nickel molybdenum alloy has a eutectic point at about 35% molybdenum after which the melting point rises above that of nickel. Molybdenum has a resistivity of 5.2 μ-ohm cm in bulk and is therefore higher amounts are desirable due to decreased resistivity. It is preferred that the nickel molybdenum alloy comprises about 42–99 wt % molybdenum. Even more preferably the nickel molybdenum alloy comprises about 50–95 wt % molybdenum. It is more preferable that the nickel molybdenum alloy comprises about 75–95 wt % molybdenum.

A nickel niobium alloy has multiple eutectic points. At about 60% niobium the melting point rises above that of nickel. It is preferred that the nickel niobium alloy comprises about 60–95 wt % niobium.

A nickel osmium alloy has an increased melting point relative to nickel and a peritectic at about 30 wt % Osmium. Osmium has a resistivity of 9.5 μ-ohm cm in bulk. The combined rheological properties and low bulk resistivity render nickel osmium alloy a particularly preferred embodiment. It is preferred that the nickel osmium alloy comprises about 5–95 wt % osmium. More preferably the nickel osmium alloy comprises about 30–95 wt % osmium. Even more preferably the nickel osmium alloy comprises about 40–95 wt % osmium.

A nickel palladium alloy has a slightly decreased melting temperature relative to nickel below about 80 wt % palladium. Palladium has a bulk resistivity of 10.8 μ-ohm cm. Nickel palladium alloy segregates to surface thereby reducing surface energy. Due to the ability to lower surface energy nickel palladium alloy is preferred even though the melt point may be lower. It is preferred that a nickel palladium alloy comprise about 80–99 wt % palladium.

Nickel platinum alloys have a slightly lower melting temperature than nickel below about 60 wt % platinum. Platinum has a bulk resistivity of 10.5 μ-ohm cm. It is preferred that a nickel platinum alloy comprise about 60–99 wt % platinum.

A nickel rhenium alloy has an increased melting point relative to pure nickel. Rhenium has a resistivity of 13.5 μ-ohm cm in bulk. Nickel rhenium alloy is a particularly preferred embodiment. It is preferred that a nickel rhenium alloy comprise about 5–99 wt % rhenium. More preferably the nickel rhenium alloy comprises about 5–30 w % rhenium. The cost of rhenium prohibits use in high concentrations even though the properties are advantageous.

A nickel rhodium allow has an increased melting point relative to nickel and an isomorphous phase structure. Rhodium has a bulk resistivity of 4.5 μ-ohm cm. Nickel rhodium alloy is a particularly preferred embodiment due to increased melting point and the low resistivity of rhodium. It is preferred that a nickel rhodium alloy comprise about 1–99 wt % rhodium. More preferably the nickel rhodium alloy comprises about 10–50 wt % rhodium. High levels of rhodium are not preferred due to the high cost of rhodium.

A nickel ruthenium allow has an increased melting point relative to nickel. The alloy has peritectic onset at about 35 wt % ruthenium. Ruthenium has a bulk resistivity of 7.6 μ-ohm cm. Nickel ruthenium alloy is a particularly preferred embodiment. It is preferred that a nickel ruthenium alloy comprise about 1–99 wt % ruthenium. More preferably, the nickel ruthenium alloy comprises about 35–99 wt % ruthenium.

A nickel tantalum alloy has multiple phases with a melting point higher than nickel. Tantalum has a bulk resistivity of 12.4 μ-ohm cm and is therefore less desirable in high concentrations. It is preferred that a nickel tantalum alloy comprise about 42–62 wt % tantalum or 68–90 wt % tantalum. More preferably the nickel tantalum alloy comprise about 45–55 wt % tantalum.

A nickel tungsten allow has an increased melting point relative to nickel. The alloy has a eutectic at about 40 wt % tungsten. Tungsten has a bulk resistivity of 5.4 μl-ohm cm. Nickel tungsten alloy is a particularly preferred embodiment. It is preferred that a nickel tungsten alloy comprise about 1–99 wt % tungsten. More preferably the nickel tungsten alloy comprise about 40–99 wt % tungsten.

It is to be noted that nickel and nickel alloys may contain up to about 0.1 wt % of phosphorous and other trace components. For the purposes of the present invention the melting point increase is determined relative to the nickel as incorporated into the alloy.

The thickness of the nickel internal electrode layers are typically above 1.5 μm. This thickness is required to inhibit the nickel layer from withdrawing from the ceramic during firing in neutral or reducing atmosphere. This phenomenon is due, in part, to the high surface energy of nickel under the firing conditions. With the present invention the combination of higher melting point and reduced surface energy allows the thickness of the layer to be reduced to no more than 1.5 μm without detriment. More preferably, the conductive layer can be reduced to no more than 1 μm and even more preferably to no more than 0.5 μm.

The dielectric layers may have any desired mean grain size with a mean grain size of about 0.2 to 0.7 μm being acceptable.

The dielectric layers have an appropriate Curie temperature which is determined in accordance with the applicable standards by suitably selecting a particular composition of dielectric material. Typically the Curie temperature is higher than 45° C., especially about 65° C. to 125° C.

Each dielectric layer preferably has a thickness of up to about 50 μm, more preferably up to about 20 μm. The lower limit of thickness is about 0.5 μm, preferably about 2 μm. The present invention is effectively applicable to multilayer ceramic chip capacitors having such thin dielectric layers for minimizing a change of their capacitance with time. The number of dielectric layers stacked is generally from 2 to about 300, preferably from 2 to about 200.

The multilayer ceramic chip capacitor of the present invention generally is fabricated by forming a green chip by conventional printing and sheeting methods using pastes, firing the chip, and printing or transferring external electrodes thereto followed by baking.

Paste for forming the dielectric layers can be obtained by mixing a raw dielectric material with an organic vehicle. The raw dielectric material may be a mixture of oxides and composite oxides as previously mentioned. Also useful are various compounds which convert to such oxides and composite oxides upon firing. These include, for example, carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. The raw dielectric material is generally used in powder form having a mean particle size of about 0.1 to about 3 μm, preferably about 1 μm.

The organic vehicle is a binder in an organic solvent. The binder used herein is not critical and may be suitably selected from conventional binders such as ethyl cellulose. Also the organic solvent used herein is not critical and may be suitably selected from conventional organic solvents such as terpineol, butylcarbinol, acetone, and toluene in accordance with a particular application method such as a printing or sheeting method.

Paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The organic vehicle is as mentioned above.

Paste for forming external electrodes is prepared by the same method as the internal electrodes layer-forming paste.

No particular limit is imposed on the organic vehicle content of the respective pastes mentioned above. Often the paste contains about 1 to 5 wt % of the binder and about 10 to 50 wt % of the organic solvent. If desired, the respective pastes may contain any other additives such as dispersants, plasticizers, dielectric compounds, and insulating compounds. The total content of these additives is preferably up to about 10 wt %.

A particularly preferred ceramic comprises barium titanate, barium strontium titanate or barium strontium zirconium Ttitanate at up to about 90 wt % with any of the lanthanides (Y, Er, Yb, Dy, Ho) as dopants at up to about 3% wt %; either Mg, Ca, or Mn or a combination thereof at no more than about 2 wt % and fluxing agent, such as a silicate glass at no more than about 6 wt %.

A green chip then may be prepared from the dielectric layer-forming paste and the internal electrode layer-forming paste. In the case of printing method, a green chip is prepared by alternately printing the pastes onto a substrate of polyethylene terephthalate (PET), for example, in laminar form, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets.

The binder is then removed from the green chip and fired. Binder removal may be carried out under conventional conditions, preferably under the following conditions where the internal electrode layers are formed of a base metal conductor such as nickel and nickel alloys.

The heating rate is preferably about 5 to 300° C./hour, more preferably 10 to 100° C./hour. The holding temperature is preferably about 200 to 400° C., more preferably 250 to 300° C. The holding time is preferably about ½ to 24 hours, more preferably 5 to 20 hours. The atmosphere is preferably air. The green chip is then fired in an atmosphere with an oxygen partial pressure of $10^{-8}$ to $10^{-12}$ atm. Extremely low oxygen partial pressure should be avoided, since at such low pressures the conductor can be abnormally sintered and may become disconnected from the dielectric layers. At oxygen partial pressures above the range, the internal electrode layers are likely to be oxidized.

For firing, the chip preferably is held at a temperature of 1,100° C. to 1,400° C., more preferably 1,250 to 1,400° C. Lower holding temperatures below the range would provide insufficient densification whereas higher holding temperatures above the range can lead to poor DC bias performance. Remaining conditions for sintering preferably are as follows. Heating rate: 50 to 500° C./hour, more preferably 200 to 300° C./hour. The holding time is preferably about ½ to 8 hours, more preferably 1 to 3 hours. The cooling rate is preferably about 50 to 500° C./hour, more preferably 200 to 300° C./hour. The firing atmosphere preferably is a reducing atmosphere. An exemplary atmospheric gas is a humidified mixture of $N_2$ and $H_2$ gases.

Firing of the capacitor chip in a reducing atmosphere preferably is followed by annealing. Annealing is effective for re-oxidizing the dielectric layers, thereby optimizing the resistance of the ceramic to dielectric breakdown. The annealing atmosphere may have an oxygen partial pressure of at least $10^{-6}$ atm., preferably $10^{-5}$ to $10^{-4}$ atm. The dielectric layers are not sufficiently re-oxidized at a low oxygen partial pressures below the range, whereas the internal electrode layers are likely to be oxidized at oxygen partial pressures above this range.

For annealing, the chip preferably is held at a temperature of lower than 1,100° C., more preferably 500° C. to 1,000° C. Lower holding temperatures below the range would oxidize the dielectric layers to a lesser extent, thereby leading to a shorter life. Higher holding temperatures above the range can cause the internal electrode layers to be oxidized (leading to a reduced capacitance) and to react with the dielectric material (leading to a shorter life). Annealing can be accomplished simply by heating and cooling. In this case, the holding temperature is equal to the highest temperature on heating and the holding time is zero.

Remaining conditions for annealing preferably are as follows. The holding time is preferably about 0 to 20 hours, more preferably 6 to 10 hours. The cooling rate is preferably about 50 to 500° C./hour, more preferably 100 to 300° C./hour.

The preferred atmospheric gas for annealing is humid nitrogen gas. The nitrogen gas or a gas mixture used in binder removal, firing, and annealing, may be humidified using a wetter. In this regard, water temperature preferably is about 5 to 75° C.

The binder removal, firing, and annealing may be carried out either continuously or separately. If done continuously, the process includes the steps of binder removal, changing only the atmosphere without cooling, raising the temperature to the firing temperature, holding the chip at that temperature for firing, lowering the temperature to the annealing temperature, changing the atmosphere at that temperature, and annealing.

If done separately, after binder removal and cooling down, the temperature of the chip is raised to the binder-removing temperature in dry or humid nitrogen gas. The atmosphere then is changed to a reducing one, and the temperature is further raised for firing. Thereafter, the temperature is lowered to the annealing temperature and the atmosphere is again changed to dry or humid nitrogen gas, and cooling is continued. Alternately, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes. Firing of the external electrode-forming paste may be carried out under the following conditions: a humid mixture of nitrogen and hydrogen gases, about 600 to 800° C., and about 10 minutes to about 1 hour.

Pads are preferably formed on the external electrodes by plating or other methods known in the art.

The capacitor is encased in resin, except for the pads, by any method known in the art.

The multilayer ceramic chip capacitors of the invention can be mounted on printed circuit boards, for example, by soldering.

The present invention has been described with particular reference to the preferred embodiments without limit. It would be apparent to one of skill in the art, based on the description herein, that alternate embodiments could be envisioned without departing from the scope of the invention which is specifically set forth in the claims appended hereto.

The invention claimed is:

1. A capacitor comprising:
   conductive layers arranged in parallel relationship wherein said conductive layers comprise nickel alloyed with a refractory element in an amount sufficient to raise the melting temperature of said conductive layer at least 1° C. above the melting temperature of nickel;
   dielectric layers between said conductive layers; and
   wherein alternating layers of said conductive layers are in electrical contact with external terminations of opposing polarity.

2. The capacitor of claim 1 wherein said nickel is alloyed with at least one element selected from cobalt, molybdenum, niobium, osmium, palladium, platinum, ruthenium, rhodium, rhenium, tantalum and tungsten.

3. The capacitor of claim 2 wherein said nickel is alloyed with at least one element selected from osmium, rhenium, ruthenium, platinum, rhodium and tungsten.

4. The capacitor of claim 3 wherein said nickel is alloyed with at least one element selected from platinum, rhodium and tungsten.

5. The capacitor of claim 2 wherein said nickel is alloyed with from 3–95 wt % cobalt.

6. The capacitor of claim 5 wherein said nickel is alloyed with from 10–50 wt % cobalt.

7. The capacitor of claim 2 wherein said nickel is alloyed with from 42–99 wt % molybdenum.

8. The capacitor of claim 7 wherein said nickel is alloyed with from 50–95 wt % molybdenum.

9. The capacitor of claim 8 wherein said nickel is alloyed with from 75–95 wt % molybdenum.

10. The capacitor of claim 2 wherein said nickel is alloyed with from 60–95 wt % niobium.

11. The capacitor of claim 2 wherein said nickel is alloyed with from 5–95 wt % osmium.

12. The capacitor of claim 11 wherein said nickel is alloyed with from 30–95 wt % osmium.

13. The capacitor of claim 12 wherein said nickel is alloyed with from 40–95 wt % osmium.

14. The capacitor of claim 2 wherein said nickel is alloyed with from 80–99 wt % palladium.

15. The capacitor of claim 2 wherein said nickel is alloyed with from 60–99 wt % platinum.

16. The capacitor of claim 2 wherein said nickel is alloyed with from 1–99 wt % ruthenium.

17. The capacitor of claim 16 wherein said nickel is alloyed with from 35–99 wt % ruthenium.

18. The capacitor of claim 2 wherein said nickel is alloyed with from 1–99 wt % rhodium.

19. The capacitor of claim 18 wherein said nickel is alloyed with from 10–50 wt % rhodium.

20. The capacitor of claim 2 wherein said nickel is alloyed with from 5–99 wt % rhenium.

21. The capacitor of claim 20 wherein said nickel is alloyed with from 5–30 wt % rhenium.

22. The capacitor of claim 2 wherein said nickel is alloyed with from 42–62 wt % tantalum.

23. The capacitor of claim 22 wherein said nickel is alloyed with from 45–55 wt % tantalum.

24. The capacitor of claim 23 wherein said nickel is alloyed with from 68–90 wt % tantalum.

25. The capacitor of claim 2 wherein said nickel is alloyed with from 1–99 wt % tungsten.

26. The capacitor of claim 25 wherein said nickel is alloyed with from 40–99 wt % tungsten.

27. The capacitor of claim 1 wherein said conductive layer is no more than 1.5 µm thick.

28. The capacitor of claim 1 wherein said conductive layer is no more than 1 µm thick.

29. The capacitor of claim 1 wherein said melting point of said conductive layer is at least 5° C. above the melting temperature of nickel.

30. The capacitor of claim 29 wherein said melting point of said conductive layer is at least 10° C. above the melting temperature of nickel.

31. A capacitor comprising:
   conductive layers arranged in parallel relationship wherein said conductive layers comprise an alloy selected from the group consisting of:
   nickel alloyed with from 3–95 wt % cobalt;
   nickel alloyed with from 5–70 wt % chromium;
   nickel alloyed with from 42–99 wt % molybdenum;
   nickel alloyed with from 60–95 wt % niobium;
   nickel alloyed with from 5–95 wt % osmium;
   nickel alloyed with from 80–99 wt % palladium;
   nickel alloyed with from 60–99 wt % platinum;
   nickel alloyed with from 1–99 wt % ruthenium;
   nickel alloyed with from 1–99 wt % rhodium;
   nickel alloyed with from 5–99 wt % rhenium;
   nickel alloyed with from 42–90 wt % tantalum; and
   nickel alloyed with from 1–99 wt % tungsten; and
   dielectric layers between said conductive layers;
   wherein alternating layers of said conductive layers are in electrical contact with external terminations of opposing polarity.

32. The capacitor of claim 31 wherein said nickel is alloyed with from 10–50 wt % cobalt.

33. The capacitor of claim 31 wherein said nickel is alloyed with from 50–95 wt % molybdenum.

34. The capacitor of claim 33 wherein said nickel is alloyed with from 75–95 wt % molybdenum.

35. The capacitor of claim 31 wherein said nickel is alloyed with from 30–95 wt % osmium.

36. The capacitor of claim 35 wherein said nickel is alloyed with from 40–95 wt % osmium.

37. The capacitor of claim 31 wherein said nickel is alloyed with from 35–99 wt % ruthenium.

38. The capacitor of claim 31 wherein said nickel is alloyed with from 10–50 wt % rhodium.

39. The capacitor of claim 31 wherein said nickel is alloyed with from 5–30 wt % rhenium.

40. The capacitor of claim 31 wherein said nickel is alloyed with from 45–55 wt % tantalum.

41. The capacitor of claim 31 wherein said nickel is alloyed with from 40–99 wt % tungsten.

42. The capacitor of claim 31 wherein said conductive layers are no more than 1.5 µm thick.

43. The capacitor of claim 42 wherein said conductive layers are no more than 1 µm thick.

44. The capacitor of claim 31 wherein said melting point of said conductive layers are at least 5° C. above the melting temperature of nickel.

45. The capacitor of claim 44 wherein said melting point of said conductive layers are at least 10° C. above the melting temperature of nickel.

46. A capacitor comprising:
   conductive layers arranged in parallel relationship wherein said conductive layers comprise nickel alloyed with at least one element selected from cobalt, molybdenum, niobium, osmium, palladium, platinum, ruthenium, rhodium, rhenium, tantalum and tungsten in an amount sufficient to raise the melting temperature of said conductive layer at least 1° C. above the melting temperature of nickel;
   dielectric layers between said conductive layers; and
   wherein alternating layers of said conductive layers are in electrical contact with external terminations of opposing polarity.

47. The capacitor of claim 46 wherein said nickel is alloyed with at least one element selected from osmium, rhenium, ruthenium, platinum, rhodium and tungsten.

48. The capacitor of claim 47 wherein said nickel is alloyed with at least one element selected from platinum, rhodium and tungsten.

49. The capacitor of claim 46 wherein said melting point of said conductive layers are at least 5° C., above the melting temperature of nickel.

50. The capacitor of claim 49 wherein said melting point of said conductive layers are at least 10° C. above the melting temperature of nickel.

51. A capacitor comprising:
   conductive layers arranged in parallel relationship wherein said conductive layers comprise nickel alloyed with at least one element selected from platinum, rhodium and tungsten; and
   dielectric layers between said conductive layers; and
   wherein alternating layers of said conductive layers are in electrical contact with external terminations of opposing polarity; and
   wherein said nickel is alloyed with in an amount of said element sufficient to raise the melting temperature of said conductive layer at least 1° C. above the melting temperature of nickel.

52. The capacitor of claim 51 wherein said nickel is alloyed with in an amount of said element sufficient to raise the melting temperature of said conductive layer at least 5° C. above the melting temperature of nickel.

53. The capacitor of claim 52 wherein said nickel is alloyed with in an amount of said element sufficient to raise the melting temperature of said conductive layer at least 10° C. above the melting temperature of nickel.

54. A capacitor comprising:
   conductive layers with a thickness of no more than 1.5 µm arranged in parallel relationship wherein said conductive layers comprise nickel alloyed with at least one element selected from cobalt, chromium, molybdenum, niobium, osmium, palladium, platinum, ruthenium, rhodium, rhenium, tantalum and tungsten;
   dielectric layers between said conductive layers;
   wherein alternating layers of said conductive layers are in electrical contact with external terminations of opposing polarity.

55. The capacitor of claim 54 wherein said nickel is alloyed with at least one element selected from osmium, rhenium, ruthenium, platinum, rhodium and tungsten.

56. The capacitor of claim 55 wherein said nickel is alloyed with at least one element selected from platinum, rhodium and tungsten.

57. The capacitor of claim 54 wherein said nickel is alloyed with from 3–95 wt % cobalt.

58. The capacitor of claim 57 wherein said nickel is alloyed with from 10–50 wt % cobalt.

59. The capacitor of claim 54 wherein said nickel is alloyed with from 5–70 wt % chromium.

60. The capacitor of claim 54 wherein said nickel is alloyed with from 42–99 wt % molybdenum.

61. The capacitor of claim 60 wherein said nickel is alloyed with from 50–95 wt % molybdenum.

62. The capacitor of claim 61 wherein said nickel is alloyed with from 75–95 wt % molybdenum.

63. The capacitor of claim 54 wherein said nickel is alloyed with from 60–95 wt % niobium.

64. The capacitor of claim 54 wherein said nickel is alloyed with from 5–95 wt % osmium.

65. The capacitor of claim 64 wherein said nickel is alloyed with from 30–95 wt % osmium.

66. The capacitor of claim 65 wherein said nickel is alloyed with from 40–95 wt % osmium.

67. The capacitor of claim 54 wherein said nickel is alloyed with from 80–99 wt % palladium.

68. The capacitor of claim 54 wherein said nickel is alloyed with from 60–99 wt % platinum.

69. The capacitor of claim 54 wherein said nickel is alloyed with from 1–99 wt % ruthenium.

70. The capacitor of claim 69 wherein said nickel is alloyed with from 35–99 wt % ruthenium.

71. The capacitor of claim 54 wherein said nickel is alloyed with from 1–99 wt % rhodium.

72. The capacitor of claim 71 wherein said nickel is alloyed with from 10–50 wt % rhodium.

73. The capacitor of claim 54 wherein said nickel is alloyed with from 5–99 wt % rhenium.

74. The capacitor of claim 73 wherein said nickel is alloyed with from 5–30 wt % rhenium.

75. The capacitor of claim 54 wherein said nickel is alloyed with from 42–62 wt % tantalum.

76. The capacitor of claim 75 wherein said nickel is alloyed with from 45–55 wt % tantalum.

77. The capacitor of claim 54 wherein said nickel is alloyed with from 68–90 wt % tantalum.

78. The capacitor of claim 54 wherein said nickel is alloyed with from 1–99 wt % tungsten.

79. The capacitor of claim 78 wherein said nickel is alloyed with from 40–99 wt % tungsten.

80. The capacitor of claim 54 wherein said conductive layers are no more than 1 μm thick.

81. The capacitor of claim 80 wherein said conductive layers are no more than 0.5 μm thick.

* * * * *